US008004454B2

(12) United States Patent
Lindoff et al.

(10) Patent No.: US 8,004,454 B2
(45) Date of Patent: Aug. 23, 2011

(54) MOBILE ELECTRONIC DEVICE EQUIPPED WITH RADAR

(75) Inventors: Mats Eric Gustav Lindoff, Lund (SE); Magnus Blomkvist, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1272 days.

(21) Appl. No.: 11/561,003

(22) Filed: Nov. 17, 2006

(65) Prior Publication Data

US 2008/0117094 A1 May 22, 2008

(51) Int. Cl.
*G01S 13/58* (2006.01)
*G01S 13/42* (2006.01)
*G01S 13/10* (2006.01)
*G01S 7/28* (2006.01)
*G01S 13/00* (2006.01)

(52) U.S. Cl. ............. 342/134; 342/27; 342/28; 342/52; 342/55; 342/104; 342/109; 342/118; 342/175; 342/176; 342/195

(58) Field of Classification Search ............... 340/425.5; 175/57, 61; 342/20, 21, 27, 28, 29–58, 60, 342/70–72, 89–115, 118, 134–147, 175, 342/195, 357.01–357.17, 450–465, 176, 342/352, 357.2, 357.21, 357.22, 357.25; 455/403, 422.1, 456.1–457, 550.1, 556.1, 455/566, 73, 90.1; 701/200, 207, 213
See application file for complete search history.

(56) References Cited

U.S. PATENT DOCUMENTS

| | | | | |
|---|---|---|---|---|
| 3,735,398 A * | 5/1973 | Ross | ................................ | 342/21 |
| 3,750,169 A * | 7/1973 | Strenglein | ....................... | 342/72 |
| 3,898,653 A * | 8/1975 | Ban et al. | ....................... | 342/109 |
| 3,978,481 A * | 8/1976 | Angwin et al. | .................. | 342/71 |
| 4,132,991 A * | 1/1979 | Wocher et al. | ................. | 342/134 |
| 6,070,079 A * | 5/2000 | Kuwahara | .................... | 455/456.2 |
| 6,215,438 B1 * | 4/2001 | Oswald et al. | .................. | 342/70 |
| 6,384,768 B1 * | 5/2002 | Kai | ................................. | 342/70 |
| 6,886,644 B2 * | 5/2005 | Stump et al. | ..................... | 175/61 |
| 7,042,391 B2 * | 5/2006 | Meunier et al. | ........... | 342/357.02 |
| 7,053,816 B2 * | 5/2006 | Kai | ................................ | 342/70 |

(Continued)

FOREIGN PATENT DOCUMENTS

DE 100 51 743 A1 5/2002

(Continued)

OTHER PUBLICATIONS

Definition of "communication" in "Webster's Third New International Dictionary" (unabridged); copyrighted in the year 1993; accessed on the Internet at lionreference.chadwyck.com.*

(Continued)

*Primary Examiner* — Bernarr E Gregory
(74) *Attorney, Agent, or Firm* — Harrity & Harrity, LLP

(57) ABSTRACT

The present invention is directed towards method, apparatus, and computer product for obtaining additional information in relation to a target in the vicinity of a mobile electronic device as well as such a mobile electronic device. The device includes a radar unit for operation in a certain frequency range including a pulse generating unit, a transmitting and receiving antenna, an echo detecting unit, a timing unit for timing the generation and transmission of pulses and providing an echo detection window for the echo detecting unit to detect echoes of said pulses when being reflected by a target, and a signal processing unit configured to process received echo pulses.

23 Claims, 3 Drawing Sheets

U.S. PATENT DOCUMENTS

| | | | |
|---|---|---|---|
| 7,164,382 B2 * | 1/2007 | Kai | 342/70 |
| 7,301,494 B2 * | 11/2007 | Waters | 342/20 |
| 2003/0006888 A1 * | 1/2003 | Burchette et al. | 340/425.5 |
| 2004/0214598 A1 * | 10/2004 | Parameswaran Rajamma | 455/556.1 |
| 2005/0130677 A1 * | 6/2005 | Meunier et al. | 455/456.6 |
| 2005/0242984 A1 * | 11/2005 | Waters | 342/20 |
| 2006/0052112 A1 * | 3/2006 | Baussi et al. | 455/456.1 |

FOREIGN PATENT DOCUMENTS

| | | |
|---|---|---|
| EP | 1 059 510 A1 | 12/2000 |
| JP | 2005-109920 | 4/2005 |
| WO | WO 01/39103 A1 | 5/2001 |
| WO | WO 03/052455 A1 | 6/2003 |
| WO | WO 2004/036246 A1 | 4/2004 |

OTHER PUBLICATIONS

International Search Report with Written Opinion dated May 10, 2007 for corresponding PCT Application No. PCT/EP2007/054868, 25 pages.

* cited by examiner

MOBILE ELECTRONIC DEVICE EQUIPPED WITH RADAR

TECHNICAL FIELD OF THE INVENTION

The present invention generally relates to mobile electronic devices and, more particularly, to a system and logic for obtaining additional information pertaining to an identified object in relation to a mobile electronic device, as well as a mobile electronic device in which the systems and method may be implemented.

DESCRIPTION OF RELATED ART

In the field of mobile electronic devices, such as cellular phones and other portable communication devices, use of limited-range frequencies, such as UWB (Ultra Wide Band), has been suggested for short-range communication between suitably enabled devices.

Accordingly, such devices may be provided with antennas, transmission and receiving circuits, and the like, for operating capability in the UWB frequency range.

However, in relation to at least the UWB frequency range, the inventors have discovered another very interesting functionality that may be used, and that is the use of radar.

SUMMARY OF THE INVENTION

The present invention is directed to providing radar functionality in various mobile electronic devices.

Implementations of the present invention may provide a method of obtaining information related to an object in the vicinity of a mobile electronic device.

In one implementation, in a mobile device, a method for obtaining information related to a target in a vicinity of the mobile device includes generating at least one pulse; transmitting the at least one pulse in a direction of the target; providing an echo detection window in which to detect an echo pulse formed from the at least one pulse being incident upon the target; receiving the echo pulse in the echo detection window; and processing the received echo pulse for providing processed data.

In another implementation, the method includes obtaining data from another source than the echo pulse, combining the data from the other source with data obtained through the processing of said echo pulse and presenting this combined data.

In another implementation, the data from the other source includes data associated with a location of the mobile device.

In another implementation, the processing includes determining a distance from the mobile device to the target, and the presenting the combined data includes presenting the distance.

In another implementation, the providing the data associated with the location of the mobile device comprises providing a view-finder image at the device; the processing the received echo pulse comprises determining a position associated with the target; and the combining comprises combining the position associated with the target with the view-finder image.

In another implementation, the determination of a position associated with the target is based on the location of an antenna of the device and an associated dispersion.

In another implementation, the providing data associated with the location of the mobile device comprises providing a position determined for the mobile device; and the combining comprises determining the location and velocity of the target based on positions of the mobile device obtained from a position determining unit of the mobile device and distances to the target obtained via processed echo pulses.

In another implementation, the determination of the location and velocity of the target is based on Doppler analysis.

In another implementation, the echo pulse provides information embedded in the target and the processing the echo pulse comprises processing the echo pulse to obtain the embedded information.

In another implementation, the providing data associated with the location of the mobile device comprises capturing an image via the mobile device, wherein the image at least partially obscures the target; and the combining comprises combining the captured image and the embedded information.

Further implementations provide a mobile device that includes radar.

In yet another implementation, a mobile device includes: a radar unit for operation in a predetermined frequency range. The radar unit includes: a pulse generating unit, a transmitting and receiving antenna, an echo detecting unit, a timing unit configured to time generation of a pulse by the pulse generating unit and transmission of the pulse via the antenna, and provide an echo detection window for the echo detecting unit to detect an echo of the pulse when the pulse has been reflected by a target, and a signal processing unit configured to process the echo pulse received in the echo detection window to form first information related to the target.

In another implementation, the mobile device includes another unit configured to acquire second information related to the target; a combining unit configured to combine the first and second information to form combined data; and a presenting unit configured to present the combined data.

In another implementation, the other unit comprises a location data providing unit configured to provide data associated with a location of the mobile device.

In another implementation, the signal processing unit is configured to process the received echo pulse to determine a distance from the mobile device to the target and the presenting unit is further configured to present the distance.

In another implementation, the presenting unit includes a display, the location data providing unit comprises an image capturing unit configured to provide data associated with the location of the mobile device in a form of digital images, the signal processing unit is configured to determine a position associated with the target, and the combining unit is configured to combine the position associated with the target with a view-finder image from the image capturing unit to be presented via the display.

In another implementation, the signal processing unit is configured to determine a dispersion of the antenna and determine a position associated with the target to be rendered via the display based on the location of the antenna and the dispersion.

In another implementation, the location data providing unit is a position determining unit for determining the position of the mobile device and the data combining unit is configured to determine the location and velocity of the target based on positions of the mobile device obtained via the position determining unit and distances to the target obtained via the signal processing unit.

In another implementation, the data combining unit is configured to determine the location and velocity of the target based on Doppler analysis.

In another implementation, the echo pulse includes information embedded in the target and the signal processing unit is configured to process the echo pulse to obtain the embedded information.

In another implementation, the presenting unit includes a display and the location data providing unit comprises an image capturing unit configured to provide data associated with the location of the mobile device as a digital image and the data combining unit combines an image captured by the camera, wherein the captured image at least partially obscures the target.

In another implementation, the mobile device includes a portable electronic device.

In another implementation, the mobile device includes a portable communication device.

In another implementation, the mobile device includes a mobile phone.

In yet a further implementation, a mobile electronic device for obtaining information related to a target in a vicinity of the mobile electronic device includes: means for generating at least one pulse signal; means for transmitting the at least one pulse signal toward the target; means for providing an echo detection window in which to detect an echo of the at least one pulse signal, wherein the echo is created by the at least one pulse signal being incident upon the target, means for receiving the echo in the echo detection window; and means for processing said received echo to generate processed data related to the target.

Other implementations provide a computer program product that enables the provision of radar in a mobile electronic device.

In yet a still further implementation, a computer program product for obtaining information related to a target in a vicinity of a mobile electronic device and comprising computer program code causes the mobile electronic device to, when the code is loaded executed by the mobile electronic device: instruct generation of at least one radar signal; instruct transmission of the at least one radar signal, wherein the at least one radar signal is directed toward the target by positioning of the mobile electronic device; instruct provision of an echo detection window in which to detect an echo signal associated with the radar signal being incident upon the target; instruct processing of the received echo pulse for providing processed data; and instruct rendering of the processed data via the mobile electronic device.

Implementations consistent with the principles of the invention provide a number of advantages. By providing radar in a mobile electronic device, a number of interesting novel functions that can be performed in a mobile electronic device can be obtained. Since mobile electronic devices typically include a number of different applications, several useful combinations can be achieved. Radar capabilities may, for instance, be combined with a camera, a microphone and/or a positioning application. Implementations of the present invention may use components provided for UWB communication and other optional units, like camera and GPS, already provided in many mobile electronic devices, the additional costs associated with providing the present invention is in essence only the costs associated with providing some additional software and a suitable clock for timing purposes.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The accompanying drawings, which are incorporated in and constitute a part of the specification, illustrate an implementation of the invention and, together with the description, explain the invention. In the drawings, FIG. 1 schematically shows a front view of a mobile terminal in which systems and methods described herein may be implemented.

DETAILED DESCRIPTION OF EMBODIMENTS

The present invention relates to a mobile electronic device that may be provided with radar functionality. The radar may use electromagnetic waves in Ultra Wide Band (UWB) frequency range, which may be in a range of from about 3 to about 11 GHz, for instance, from about 3.1 to about 10.6 GHz.

Figure 1:
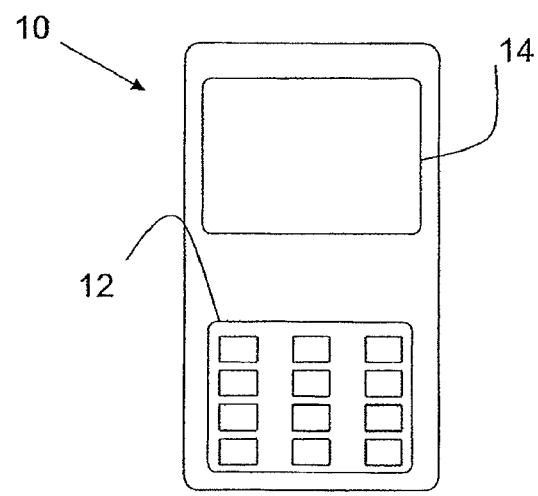

FIG. 1 shows a mobile electronic device in the form of a portable communication device 10, which in FIG. 1 is exemplified as a mobile terminal, such as phone 10. To permit a user to control any of a number of various functions of phone 10, like a camera, a GPS (global positioning system) navigation unit, web browser, messaging applications etc. (not shown), phone 10 may include an information presenting unit in the form of a display 14 and a set of user input units in the form of a number of keys on a keypad 12. Phone 10 may furthermore be provided with a speaker and a microphone (not shown), as well as any number of other components. A mobile phone is merely one example of a mobile electronic device. The invention is in no way limited to a particular type of device, but can be applied to other types of devices, for instance, a smartphone and a communicator and/or other portable electronic devices, like a laptop computer, a palmtop computer, an electronic organizer, a digital camera, a camcorder, an electronic gaming machine, etc. The mobile communication device may also be provided as an integral component of a vehicle, like a car or a truck.

Figure 2:
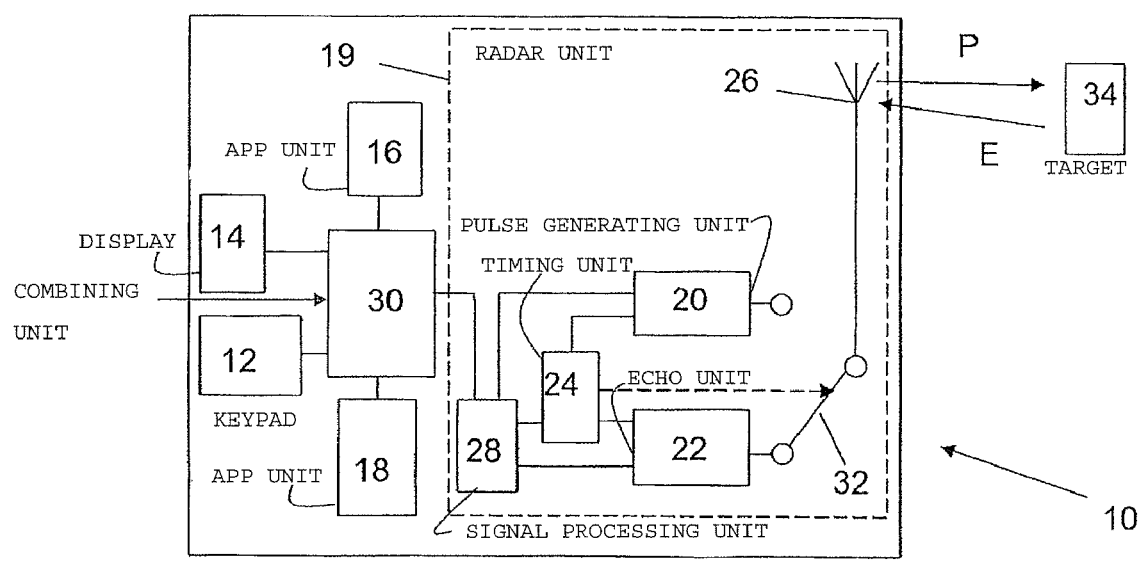
FIG. 2 is a functional block diagram of the mobile terminal of FIG. 1.

FIG. 2 is a functional block schematic of phone 10. Phone 10 may include a radar unit 19 configured, for example, to operate in a predetermined frequency range, which may include transmissions in the UWB frequency range. In one implementation, radar unit 19 may be stationary, i.e., fixedly attached to phone 10. In another implementation, radar unit 19 may be displaceably disposed in phone 10. Radar unit 19 may be configured to be placed in a number of different directions by orienting phone 10 in different directions, for example, when a user handles phone 10. Radar unit 19, which is indicated by a dashed box, may include a pulse generating unit 20, which may be configured to selectably connect to a transceiver, such as a transmitting and receiving antenna 26 via a switch 32 or another mechanism. An echo detecting unit 22 may be configured to selectably connect to antenna 26 via switch 32 or another mechanism. A timing unit 24 may connect to pulse generating unit 20, echo receiving unit 22, and/or a signal processing unit 28. Timing unit 24 may control switch 32 so as to connect pulse generating unit 20 or echo detecting unit 22 to antenna 26. In operation, pulse generating unit 20 of radar unit 19 may emit one or more radar pulses P that may be transmitted by antenna 26, for example, in a direction of a particular object, such as target 34. Some or all of radar pulses P incident upon target 34 may be reflected in the form of one or more echo pulses E. Some or all of echo pulses E may be detected by echo detecting unit 22, for example, in an echo detection window provided by timing unit 24. Signal processing unit 28 may connect to echo detecting unit 22 and/or pulse generating unit 20.

Signal processing unit 28 may connect to a data combining unit 30. Data combining unit 30 may connect to application handling units 16 and 18. Application handling units 16, 18 may include units besides radar unit 19, and which are sources or providers of data. Data providing units may include location data providing units that provide data associated with a location of phone 10. Another type of data providing unit may be an image capturing unit in the form of a camera 16, for instance, while a another type may include a position determining unit in the form of a GPS unit 18. Combining unit 30 may connect to display 14, keypad 12, and/or other components of phone 10.

Camera 16 may include a lens connected to a digital image receiving unit, which may convert a projected image into a digital picture or video sequence. The digital image receiving unit include a CCD (charge-coupled device) unit, for example. The digital image receiving unit may connect to an image storage or memory and to a camera control unit. Using the camera, a view-finder image may be provided on display 14. The camera may also provide a captured digital image on display 14.

Figure 3:
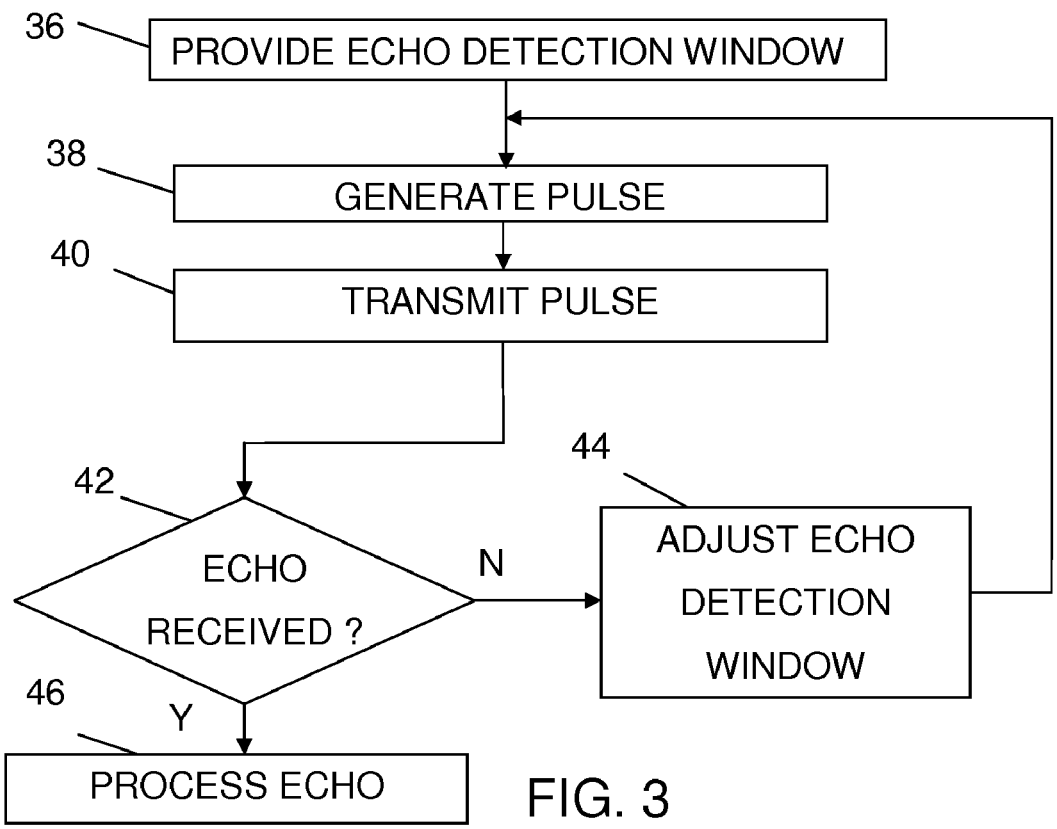
FIG. 3 shows a flow chart of a number of method steps for processing an echo signal according to the present invention carried out in the phone.

FIG. 3 shows a flow chart outlining a number of method steps providing the general processing of an echo signal. The exemplary steps may be performed according to principles of the present invention using radar unit 19. The general function of a radar application implemented by radar unit 19 will now be described with reference being made to FIGS. 2 and 3.

Processing may begin, for example, with a radar application being selected, which radar application may be controlled via signal processing unit 28. A radar application may be combined with a number of the other applications of the phone 10, some combinations of which will be described in more detail later. A radar application may be used, for example, to perform distance measurements, collision warning techniques, fluid level detection processes, presence detection surveillance, as well as ground and wall penetration evaluation.

Upon selection of a radar application, signal handling unit 28 may instruct timing unit 24 to provide an echo detection window (act 36). Based on the received instruction, timing unit 24 may cause pulse generating unit 20 to connect to antenna 26 via operation of switch 32. Signal handling unit 28 may instruct pulse generating unit 20 to generate one or more (e.g., a series of) radar pulses P (act 38). Radar pulse P may be transmitted via antenna 26 in a direction determined by, for example, an orientation of phone 10 (act 40). Timing unit 24 may control switch 32 to cause echo detecting unit 22 to connect to antenna 26 during the echo detection window, and echo detecting unit 22 may be caused to disconnect from antenna 26. When one or more echoes E of transmitted radar pulse P is received by echo detecting unit 22, the received echo E may be forwarded to signal processing unit 28. When no or insufficient echoes E are received by echo detecting unit 22 (act 42), signal processing unit 28 may instruct timing unit 24 to adjust the echo detection window (act 44). The generation of radar pulse P (i.e., act 38), the transmission of radar pulse P (i.e., act 40), and determining if echo pulse E is received (i.e., act 42), may be re-performed.

When echo pulse E is received (i.e., act 42), signal processing unit 28 may process one or more received echoes E based on a type of application radar 19 is operating according to (act 46). The radar application may, for instance, determine a distance to target 34 based on the time between the transmission of radar pulse P and the reception of echo pulse E. In one implementation, signal processing unit 28 may process one or more received echo pulses E to obtain some information provided by, e.g., embedded in, target 34, for instance, a bar code that may be an URL (Uniform Resource Locator). All or some of the results of the processing may be presented by signal processing unit 28 to a user of phone 10 via, for example, display 14 or other component.

As mentioned above, a number of different applications that may be advantageously combined with a radar application. Three non-limiting examples consistent with the principles of the invention are provided below.

Figure 4:
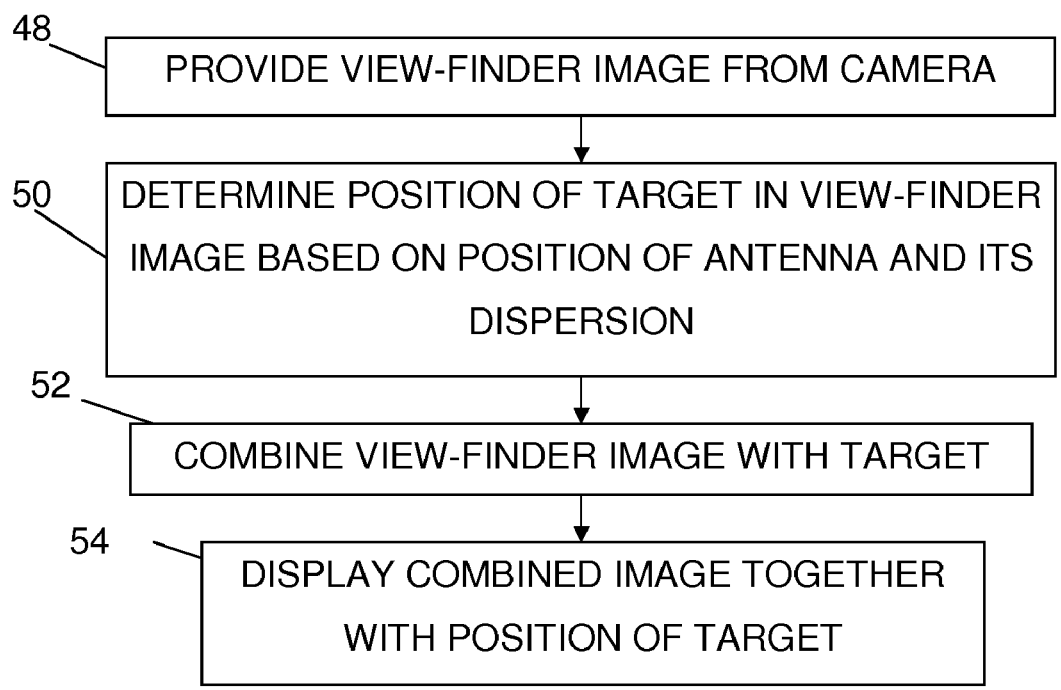
FIG. 4 shows a flow chart of a method of combining the processed echo signal with location dependent data according to a first embodiment of the present invention.

FIG. 4 shows a flow chart of a method of combining the processed echo with data associated with the location of phone 10 according to a first implementation.

A first exemplary implementation will now be described with reference to FIGS. 2 and 4. A user may select to combine data from radar unit 19 with operation of the view-finder function of camera 16. The selection may be received, for example, via an input from keypad 12, which selection may be forwarded to combining unit 30. Combining unit 30 may, in response to receiving such a user selection, be caused to connect to camera 16 and instruct cameras 16 to provide a view-finder image (act 48). In response to the instruction, camera 16 may supply, for example, a view-finder image to combining unit 30. Combining unit 30 may instruct radar unit 19 to detect, for example, target 34, to determine the dispersion of antenna 26 and perform some further processing. The dispersion may determined by, for example, signal processing unit 28 through analyses of some or all of received echo pulses E. Based on the dispersion and the distance of target 34, signal processing unit 28 may determine a position of target 34 in an image plane associated with phone 10. The result may be forwarded to combining unit 30. Combining unit 30 may have previous knowledge of the position of antenna 26 and the position of the lens of camera 16 in phone 10 and may relate the position of target 34 to a position in the view-finder image based on the prior knowledge.

Based on the acquired information, a position of target 34 in the view-finder image may determined (act 50). Combining unit 30 may provide a target symbol, which may be combined with the view-finder image (act 52). The combined view-finder image and target symbol may be rendered via display 14 (act 54). It should be realized that this may be advantageously combined with presenting the distance to target 34, which distance may be determined by signal processing unit 28 substantially as described above.

Figure 5:
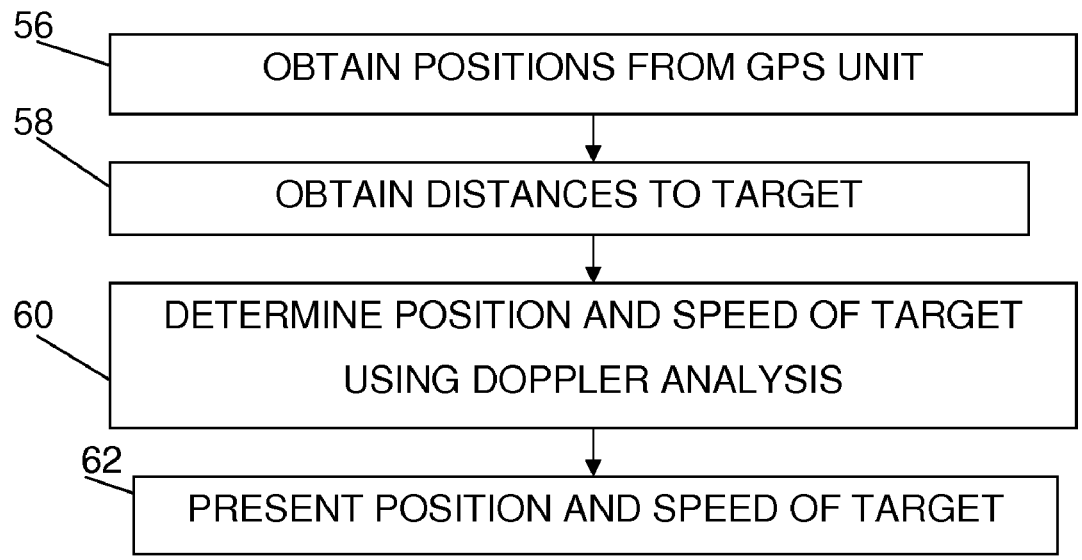
FIG. 5 shows a flow chart of a method of combining the processed echo signal with location dependent data according to a second embodiment of the present invention.

FIG. 5 shows a flow chart of a method of combining the processed echo with data associated with a location of phone 10 according to a second implementation.

A second implementation will now be described with reference to FIGS. 2 and 5. A user may select to use a radar application in a function combining, for example, radar unit 19 with operation of GPS unit 18. The selection may be received for example, via an input received keypad 12, which selection may be forwarded to combining unit 30. Combining unit 30 may, in response to receiving such a user selection, be caused to connect to GPS unit 18 and instruct GPS unit 18 to acquire signals from which physical location information of phone 10 may be derived. The location information may be obtained, for example, by receiving signals from a GPS system via a GPS antenna of GPS unit 18. The location information may be forwarded from GPS unit 18 to combining unit 30, which may obtain a physical location of phone 10 (act 56). Combining unit 30 may instruct radar unit 19 to provide distance measurements to target 34. In response, radar unit 19 may provide distance measurements substantially as described above. The distance measurements may be supplied to combining unit 30.

Using the information received from GPS unit 18 and radar unit 19, combining unit 30 may obtain distances to target 34 (act 58). Combining unit 30 may determine a position as a function of time of target 34, for example, relative to phone 10 (act 60). In one implementation, determining the location of target 34 relative to phone 10 may be accomplished by determining a velocity and location of phone 10 and/or target 34 using the information obtained from GPS unit 18 and calculating the velocity and location (e.g., a velocity vector) based on the distances of target 34 obtained at different points in time and by applying Doppler analysis. Combining unit 30 may present the position and velocity of target 34 (act 62), for example, using display 14 to render graphical or textual information. An audible sound (e.g., an alarm of varying volume, pitch, and/or tempo, etc.) may be rendered that corresponds to the calculated position and velocity of target 34. In one implementation, the acquired information may be presented verbally, as audible speech. In one implementation, this type of combined functionality may be provided for a vehicle, for example, to determine the distance and velocity of an approaching vehicle.

Figure 6:
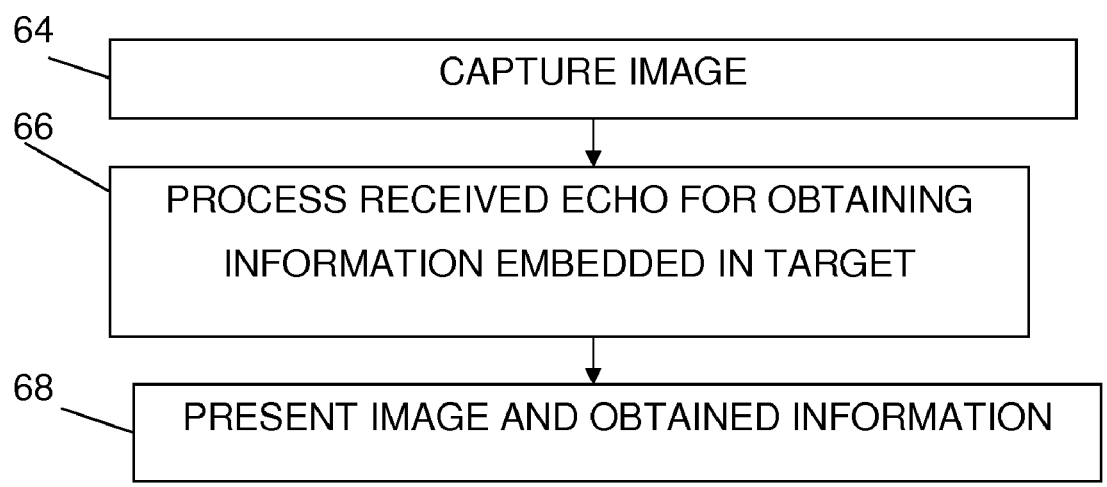
FIG. 6 shows a flow chart of a method of combining the processed echo signal with location dependent data according to a third embodiment of the present invention.

FIG. 6 shows a flow chart of a method of combining the processed echo with data associated with a location of phone 10 according to a third implementation.

A third implementation will now be described with reference to FIGS. 2 and 6. A user may select to combine data from radar unit 19 with an image captured at camera 16. The selection may be received, for example, via an input received from keypad 12, which selection is forwarded to combining unit 30. Combining unit 30 may, in response to receiving such a user selection, be caused to connect to camera 16 and instruct camera 16 capture an image or a sequence of images (act 64). Concurrently, combining unit 30 may instruct radar unit 19 to detect detectable information embedded in target 34. For example, assume target 34 has been provided behind an image and has a radar tag embedded therein. Target 34 may be obscured by the image, i.e., target 34 may not be visible from a vantage point of phone 10. Assume target 34 is almost a same size as the image. Target 34 may include any of a number of materials having different qualities regarding how well the materials absorb and/or reflect radar waves. Radar unit 19 may emit a radar pulse P, which may be entirely or partially reflected by target 34 as exhibited by one or more echo pulses E. Echo pulse(s) E may be received by echo detecting unit 22. The received echo pulse(s) E may be forwarded to signal processing unit 28. Signal processing unit 28 may process the forwarded echo pulse(s) E to thereby obtain the information therefrom (act 66). The result produced may be provided to combining unit 30. Combining unit 30 may determine a type of the information, for instance, whether the information includes a URL and present the information together with the image. For example, combining unit 30 may present the image together with a hyperlink to an URL associated with the image (act 68). In one implementation, the URL is not immediately seen, but may be selected by the user clicking on the image. Alternatively the URL may be provided in a window along with but separate from the image. By performing the above process, additional information related to an image can be obtained by and presented to a user of phone 10. In one implementation, the image is aesthetically more pleasing since the functional, but less pleasing additional information, is hidden from view.

A number of variations can be made to the present invention apart from the ones already mentioned. For example, other units than a camera and a GPS unit, like a microphone, may be used. It is, for instance, possible to use and provide a distance and direction to a sound source by combining information from the sound received by a directional microphone and the echo detected by radar unit 19. Location information may be acquired using other devices than GPS nit 18. For example, triangulation in relation to a number of access points, like base stations, WLAN access points, and/or BLUETOOTH® access points may be used. Other combinations of information are possible.

The present invention opens up a number of interesting applications, where just a few have been mentioned above. Several further applications can be used in combination with radar operations. Since mobile electronic devices typically are enabled for performing a number of different applications, several interesting combinations can be achieved by incorporating a radar device therein.

Implementations of the present invention have a number of further advantages. Since the present invention may use components provided for UWB communication, which, as mentioned above, may be used in short-range communication and the other units, e.g., camera and GPS, exist in mobile electronic devices, additional costs associated with implementing systems and methods consistent with the principles of the present invention is, in essence, only the costs associated with providing some additional software and a suitable clock or other timing unit configured to measure time to a suitable degree of a precision.

Figure 7:
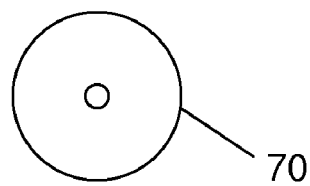
FIG. 7 schematically shows a computer program product in the form of a CD Rom disc comprising computer program code for carrying out the present invention.

The combining and signal processing units in the phone are normally each provided in the form of one or more processors together with a program memory storage device containing program code for performing the functions of these units and ordering the application handling units, timing unit, pulse generating unit, and/or echo detecting unit to perform their above described functions. The program code can also be provided on a tangible computer program product, like a CD ROM disc, a memory stick or another suitable data carrier, which may execute implementations of the invention upon being loaded into a device configured to execute computer programs. One such medium is schematically shown in FIG. 7, which shows a CD ROM disc 70, on which the program code for the phone may be provided. The program code may alternatively be provided on an external server and downloaded from there into the camera and/or the phone.

Therefore the present invention is only to be limited by the following claims.

What is claimed is:

1. In a portable electronic device, a method for obtaining information related to a target in a vicinity of the portable electronic device, the method comprising:
generating, by the portable electronic device, at least one pulse;
transmitting, by the portable electronic device, the at least one pulse in a direction of the target;
providing, by the portable electronic device, a time period for echo detection in which to detect an echo pulse formed from the at least one pulse being incident upon the target;

receiving, by the portable electronic device, the echo pulse in the time period for echo detection; and processing, by the portable electronic device, the received echo pulse for providing processed data.

2. The method according to claim 1, further comprising:
obtaining data related to the target from another source;
combining the data from the other source with the processed data; and
presenting the combined data.

3. The method according to claim 2, wherein the data from the other source includes data associated with a location of the portable electronic device.

4. The method according to claim 3, wherein the processing includes determining a distance from the portable electronic device to the target, and the presenting the combined data includes presenting the distance.

5. The method according to claim 4, wherein the providing the data associated with the location of the portable electronic device comprises providing a view-finder image at the device; the processing the received echo pulse comprises determining a position associated with the target; and the combining comprises combining the position associated with the target with the view-finder image.

6. The method according to claim 5, wherein the determination of a position associated with the target is based on the location of an antenna of the portable electronic device and an associated dispersion.

7. The method according to claim 4, wherein the providing data associated with the location of the portable electronic device comprises providing a position determined for the portable electronic device; and the combining comprises determining the location and velocity of the target based on positions of the portable electronic device obtained from a position determining unit of the portable electronic device and distances to the target obtained via processed echo pulses.

8. The method according to claim 7, wherein the determination of the location and velocity of the target is based on Doppler analysis.

9. The method according to claim 3, wherein the echo pulse provides information embedded in the target and the processing the echo pulse comprises processing the echo pulse to obtain the embedded information.

10. The method according to claim 9, wherein the providing data associated with the location of the portable electronic device comprises capturing an image via the portable electronic device, wherein the image at least partially obscures the target; and the combining comprises combining the captured image and the embedded information.

11. A portable electronic device comprising:
a radar unit for operation in a predetermined frequency range, the radar unit including:
a pulse generating unit,
a transmitting and receiving antenna,
an echo detecting unit,
a timing unit configured to time generation of a pulse by the pulse generating unit and transmission of the pulse via the antenna, and provide a time period for echo detection for the echo detecting unit to detect an echo of the pulse when the pulse has been reflected by a target, and
a signal processing unit configured to process the echo pulse received in the time period for echo detection to form first information related to the target.

12. The portable electronic device according to claim 11, further comprising:
another unit configured to acquire second information related to the target;
a combining unit configured to combine the first and second information to form combined data; and
a presenting unit configured to present the combined data.

13. The portable electronic device according to claim 12, wherein the other unit comprises a location data providing unit configured to provide data associated with a location of the portable electronic device.

14. The portable electronic device according to claim 13, wherein the signal processing unit is configured to process the received echo pulse to determine a distance from the portable electronic device to the target and the presenting unit is further configured to present the distance.

15. The portable electronic device according to claim 14, wherein the presenting unit comprises a display,
the location data providing unit comprises an image capturing unit configured to provide data associated with the location of the portable electronic device in a form of digital images,
the signal processing unit is configured to determine a position associated with the target, and
the combining unit is configured to combine the position associated with the target with a view-finder image from the image capturing unit to be presented via the display.

16. The portable electronic device according to claim 15, wherein the signal processing unit is configured to determine a dispersion of the antenna and determine a position associated with the target to be rendered via the display based on the location of the antenna and the dispersion.

17. The portable electronic device according to claim 13, wherein the location data providing unit is a position determining unit for determining the position of the portable electronic device and the data combining unit is configured to determine the location and velocity of the target based on positions of the portable electronic device obtained via the position determining unit and distances to the target obtained via the signal processing unit.

18. The portable electronic device according to claim 17, wherein the data combining unit is configured to determine the location and velocity of the target based on Doppler analysis.

19. The portable electronic device according to claim 12, wherein the echo pulse includes information embedded in the target and the signal processing unit is configured to process the echo pulse to obtain the embedded information.

20. The portable electronic device according to claim 19, wherein the presenting unit comprises a display and the location data providing unit comprises an image capturing unit configured to provide data associated with the location of the portable electronic device as a digital image and the data combining unit combines an image captured by the camera, wherein the captured image at least partially obscures the target.

21. The portable electronic device according to claim 11, wherein the portable electronic device comprises a mobile phone.

22. A portable electronic device for obtaining information related to a target in a vicinity of the portable electronic device, the portable electronic device comprising:
means for generating at least one pulse signal;
means for transmitting the at least one pulse signal toward the target;
means for providing a time period for echo detection in which to detect an echo of the at least one pulse signal, wherein the echo is created by the at least one pulse signal being incident upon the target,
means for receiving the time period for echo in the echo detection; and means for processing said received echo to generate processed data related to the target.

23. A computer readable medium with computer readable program code for obtaining information related to a target in a vicinity of a portable electronic device, the program code comprising:

instructions to generate at least one radar signal;

instructions to transmit the at least one radar signal, wherein the at least one radar signal is directed toward the target by positioning of the portable electronic device;

instructions to provide a time period for echo detection in which to detect an echo signal associated with the radar signal being incident upon the target;

instructions to process the received echo pulse for providing processed data; and instructions to render the processed data via the portable electronic device.

* * * * *